Oct. 20, 1936.  S. WHITWORTH  2,057,753
BRAKE SHOE
Original Filed March 14, 1923    2 Sheets-Sheet 1
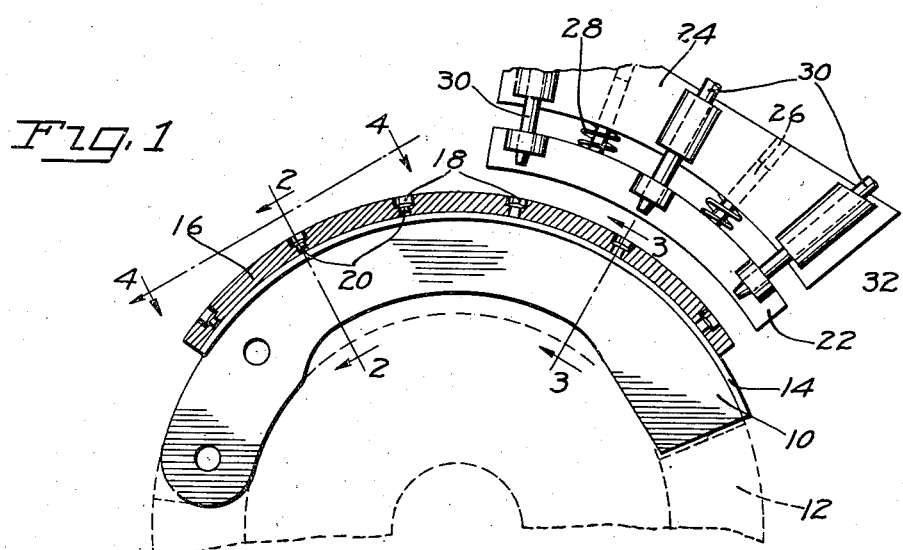
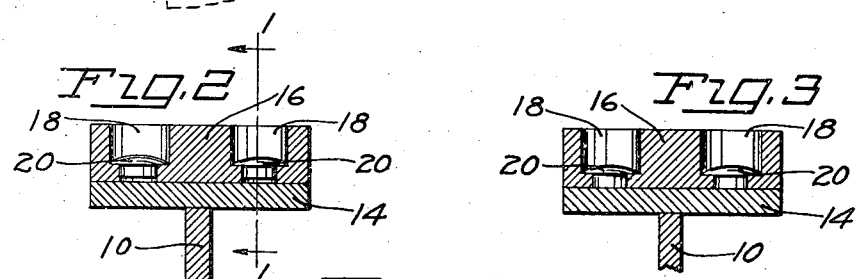
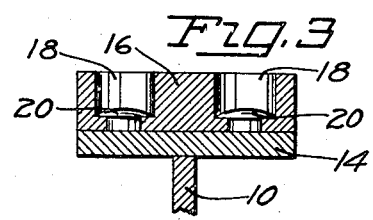
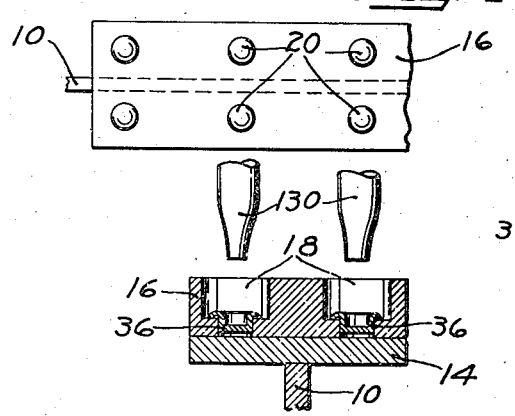
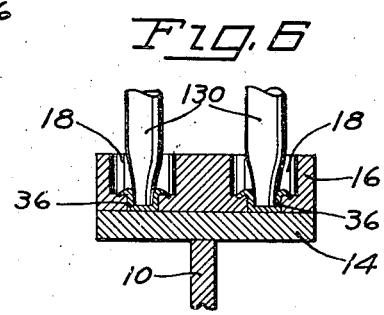
INVENTOR.
STANLEY WHITWORTH
BY  J. P. Kuiper
ATTORNEY.

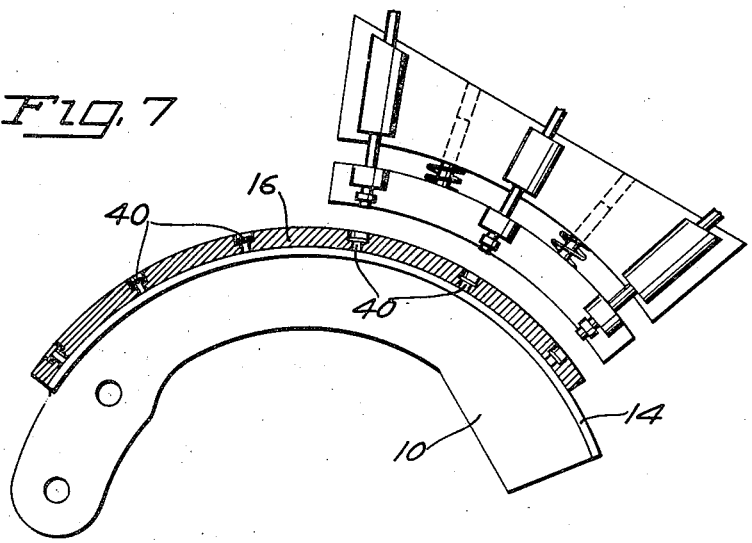
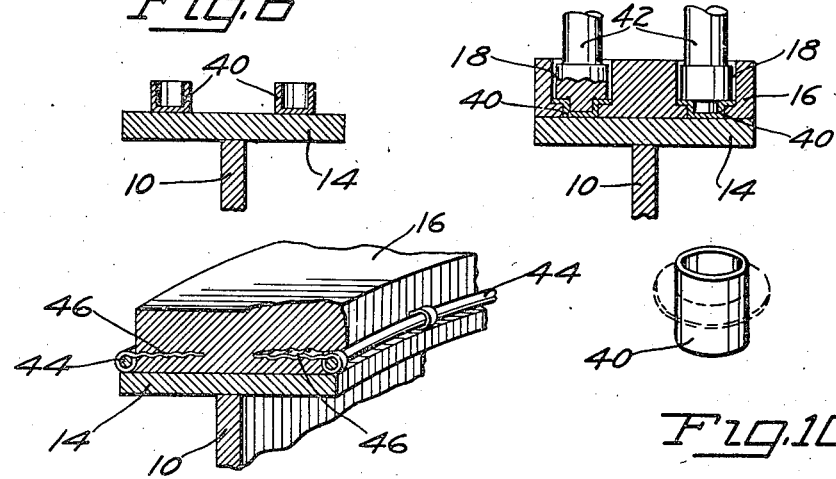

Patented Oct. 20, 1936

2,057,753

UNITED STATES PATENT OFFICE 2,057,753

BRAKE SHOE

Stanley Whitworth, South Bend, Ind., assignor to Bendix Brake Company, South Bend, Ind., a corporation of Illinois Original application March 14, 1928, Serial No. 261,579. Divided and this application July 7, 1932, Serial No. 621,267

3 Claims. (Cl. 188—234)

This invention relates to the manufacture of brake shoes and more particularly to means for the attachment of friction material or the like, usually non-metallic, to a metallic body such as the brake shoe.

An object of the invention is to lessen the cost of attaching such material by eliminating most of the operations incident to the use of rivets or similar fastenings passing through the shoe body, preferably by using fastenings engaging the lining and permanently attached to the face of the shoe or the like by a welding operation, although many of the benefits of the invention may be secured by previously forming the metallic body structure with outwardly extending fastenings projecting from its face, and which may for example be formed by welding separately formed fastenings thereto, and then attaching the lining by fitting it over the projections and forming them to hold the lining somewhat in the manner of a rivet.

In all of the various examples of the invention, the operations of drilling and countersinking the shoe body for rivets are eliminated entirely, and also the necessity of maintaining accurate alignment of such openings with the corresponding openings in the brake lining is obviated. Also, the cost of the fastenings themselves is cut approximately in two on account of the fact that less metal is used since they do not have to go through the metallic body structure. It should be borne in mind in this connection that fastenings such as rivets for brake linings are used in enormous quantities.

In one arrangement the fastenings are seated in openings formed in the brake lining or other non-metallic material and are secured permanently by a welding operation directly to the face of the metallic body structure, preferably a considerable number of the fastenings being welded to the body structure at one operation. It should be noted that not only can a considerable pressure be placed on the fastenings and on the lining during this operation, thus attaching the lining tightly to the body structure, but the tightness of the joint is even further increased by the contraction of the fastenings as they cool after the completion of the welding operation. As a matter of illustration, I show two forms of fastenings, one generally similar to a solid rivet and the other more nearly like a hollow or tubular rivet.

I also show a general tubular rivet-like construction in the arrangement in which the fastenings are secured to the body structure before the lining is placed on the shoe. A further modification shows a metallic wire or the like secured to the lining itself and welded to the shoe body.

The above and other objects of the invention, and novel constructions and arrangements of parts contemplated by my invention, will be apparent from the following description of the manufacture and constructions illustrated by the accompanying drawings, in which:

Figure 1 is a vertical section through a brake shoe and a fixture for welding fastenings, in a plane passing through a series of the fastenings and corresponding to the line 1—1 in Figure 2;

Figure 2 is a section through the shoe on the line 2—2 of Figure 1 before the fastenings are attached to the shoe body;

Figure 3 is a similar section on the line 3—3 of Figure 1 and showing the fastenings attached to the shoe body;

Figure 4 is a top plan view of part of the shoe looking in the direction of the arrows 4—4 of Figure 1;

Figure 5 is a view corresponding to Figure 2 but showing a tubular fastening construction;

Figure 6 is a view corresponding to Figure 3 but showing the attachment of the fastenings of Figure 5;

Figure 7 is a view corresponding to Figure 1 but showing the use of fastenings previously secured to the face of the shoe;

Figure 8 is a view corresponding to Figure 2 but showing the fastenings of Figure 7 before the lining is placed on the shoe;

Figure 9 is a view corresponding to Figure 3 but showing the attachment of the lining by means of fastenings of Figure 8;

Figure 10 is a perspective view of one of the fastenings used in Figures 8 and 9; and Figure 11 is a view partly in section and partly in perspective of part of a shoe having a metallic material embedded or carried by the lining and welded to the face of the shoe body.

In the arrangement of Figures 1-4 the shoe is illustrated as built up of a steel web member 10 supported in a suitable fixture 12 arranged to serve as an electrode and permanently attached by spot welding or otherwise to a rim member 14, for example as fully described in Patent No. 1,659,368, granted February 14, 1928, to Bendix Brake Company. The present invention has to do more particularly with the attachment to a metallic body structure, such as a brake shoe of this type, of material such as a strip 16 of woven or molded brake lining.

In the arrangement of Figures 1-4 the material 16 is formed with a set of countersunk openings 18 receiving short headed fastenings 20 generally in the shape of rivets and having heads engaging the bottoms of the countersunk portions of the openings 18. Preferably the entire set of fastenings 20 is assembled in openings 18 of the material 16, the material then being placed in position on the rim 14 of the shoe while the latter is held by the fixture 12 and then part or all of the fastenings 20 are simultaneously permanently secured to the face of the rim 14 by a welding operation.

The apparatus diagrammatically shown in Figure 1 for this purpose includes a presser plate 22 approximately the width of the space between the two sets of openings 18 at opposite sides of the shoe and which presser plate 22 is connected to an outer plate 24 through the medium of guides or dowels 26, the two plates 22 and 24 being urged apart by means such as springs 28 embracing the dowels 26. Plate 24 carries a set of electrodes 30, one for each fastening 20, slidably passing through guides 32 carried by the presser plate 22. This apparatus is forced by any suitable means against the outer face of the material 16, which is thus pressed firmly against the rim 14 by the presser plate 22. The springs 28 yield while the plate 24 is pressed firmly downward by suitable mechanism, thus bringing the electrodes 30 against the heads of the fastenings 20. If desired, each electrode 30 may individually be forced firmly against the head of its fastening 20 by suitable mechanism not shown.

With all of the electrodes 30 in engagement with their fastenings 20 and forcing the bases of the fastenings firmly against the face of rim 14, and with the fixture 12 serving as the opposite electrode, current is passed, thus butt-welding the fastenings 20 permanently and securely to the face of the rim 14. Not only does this press the material 16 against the metallic body structure so firmly as to make a very tight joint, as shown in Figure 3, but the tightness of this joint is increased by the contraction of the fastenings 20 as they cool after the completion of the welding operation.

In Figure 1 the welding fixture 22—32 has just completed the welding of the fastenings 20 on the right half of the shoes, whereupon the shoe and its fixture 12 will be indexed to cause a welding on the next operation of the left half of the fastenings. On the smaller shoes it is feasible to weld all of the fastenings at once, but as the size of the shoes increases the size of the fastenings 20 increases also, until on the very largest shoes it is preferable to weld only two of the fastenings at a time. The fastenings 20 may under certain circumstances be made of steel, but ordinarily I consider it preferable to make them of brass, which I find makes a permanent and satisfactory welded joint with the steel of rim 14.

In the arrangement of Figures 5 and 6 I utilize tubular or hollow fastenings 36, preferably of brass, having reversely-turned conical flanges forming heads engaging the bottoms of the countersunk portions of openings 18. In this case the electrodes 130 correspond to the electrodes 30 of Figure 1 except that they engage the bottoms of the hollow or tubular fastenings 36 so as to confine any arcing or any sparks to the space between the bottom of the fastening and the top of the rim 14 where it is inclosed by the material 16 so that no injury can be done to the surface of the lining material. Moreover, the fastenings 36 comprise less brass than the fastenings 20 and the reversely-turned conical flanges bite deeply into the lining material 16, as shown in Figure 6, to give a very close joint.

In Figures 7 to 9 I illustrate a construction in which fastenings 40, which may be brass stampings, are attached to the shoe body by electrodes similar to the electrodes 130 but before the lining material 16 is placed in position. The material 16 is then laced over the outwardly-projecting studs formed by the fastenings 40, and the fastenings 40 are then riveted outwardly after the manner of tubular rivets, as shown in Figure 9, by tools 42 generally similar to the usual rivet sets.

In Figure 11 I show the lining material provided with brass or steel wires 44 along its opposite sides held by small stampings 46 looped over the wires 44 at their outer ends and embedded in the material 16. The wires 44 are then spot-welded at intervals to the outer face of the rim 14 of the body structure. This arrangement is more suitable for use with molded brake lining.

In each of the modifications shown, it will readily appear that the brake shoe flange is unbroken, as far as rivet holes and the like are concerned, and the consequent result is a stronger shoe or else a shoe with a web of lighter construction of the equal strength of a heavier shoe with rivet perforations. Thus considerable savings, or else an increased factor of safety may result from the herein disclosed construction.

This application is a division of my copending application Serial No. 261,579, filed March 14, 1928 and issued September 13, 1932, as Patent 1,876,811.

While a number of different ways of attaching material such as lining, according to my invention, have been illustrated in the accompanying drawings, it is not my intention to limit the scope of the invention to any particular one of the illustrated constructions or otherwise than by the terms of the appended claims.

What is claimed is:

1. A shoe body having hollow outwardly-projecting fastenings welded to its outer face and adapted to be flanged outwardly by a riveting process to engage and hold a brake lining to attach said lining to the body.

2. A brake shoe comprising a metallic surface, a friction member overlying said surface and provided with spaced countersunk apertures, and hollow fastening members in said apertures welded to the metallic surface and having outwardly turned flanges engaging the friction member, said fastening members being normally under tension when the friction member is in place, thereby securing the friction member tightly to the metallic surface.

3. A metal brake shoe comprising a reinforcing web having an arcuate flange fixed thereto, hollow outwardly projecting cylindrical fastenings welded to the outer face of the flange adapted to be flanged outwardly by a riveting operation to engage a brake lining and to hold the lining into contact with the flange.

STANLEY WHITWORTH.